United States Patent [19]  
Ohta et al.

[11] Patent Number: 4,544,443  
[45] Date of Patent: Oct. 1, 1985

[54] METHOD FOR MANUFACTURING AN OPTICAL MEMORY ELEMENT

[75] Inventors: Kenji Ohta, Yao; Junji Hirokane, Tenri; Hiroyuki Katayama; Akira Takahashi, both of Nara; Hideyoshi Yamaoka, Matsubara, all of Japan

[73] Assignee: Shap Kabushiki Kaisha, Osaka, Japan

[21] Appl. No.: 606,534

[22] Filed: May 3, 1984

[30] Foreign Application Priority Data

May 13, 1983 [JP] Japan ................................. 58-84613  
Jan. 10, 1984 [JP] Japan ................................... 59-3797

[51] Int. Cl.$^4$ ..................... B44C 1/22; C03C 15/00; C03C 25/06  
[52] U.S. Cl. .................................... 156/643; 156/646; 156/659.1; 156/663; 204/192 P; 204/192 EC; 427/131; 427/309; 430/321  
[58] Field of Search .................... 156/643, 646, 659.1, 156/663; 430/321, 313, 317; 204/192 E, 192 EC, 192 C, 192 M, 192 P, 192 D; 427/309, 131, 129; 365/215, 216

[56] References Cited

U.S. PATENT DOCUMENTS 3,542,453 11/1970 Kantor ............................. 156/645 X  
3,571,489  3/1971 Coale .............................. 156/655 X  
3,585,121  6/1971 Franks et al. ........................ 204/192  
4,290,075  9/1981 Jacobs et al. ................... 430/321 X  
4,405,677  9/1983 Chen ............................... 156/656 X  
4,431,695  2/1984 Flatscher ............................ 428/209

OTHER PUBLICATIONS

Sov. J. Opt. Technol., 45(3), Mar. 1978, Fabrication and Testing of Phase Masks for Information Storage and Processing Devices, V. Ya. Levin et al., pp. 171–174.

Primary Examiner—William A. Powell  
Attorney, Agent, or Firm—Birch, Stewart, Kolasch & Birch

[57] ABSTRACT

An optical memory element includes stripe-shaped grooves formed directly on a glass substrate. To manufacture the optical memory element, a resist film is disposed on the glass substrate, and a groove pattern is formed in the resist film. A reactive ion etching is conducted through the groove pattern formed in the resist film so as to form the guide grooves in the glass substrate. After removing the resist film from the glass substrate, a magneto-optical recording layer is formed on the glass substrate.

16 Claims, 16 Drawing Figures

METHOD FOR MANUFACTURING AN OPTICAL MEMORY ELEMENT

BACKGROUND OF THE INVENTION

1. Field of the Invention

The present invention relates to a method for manufacturing an optical memory element which optically records the information therein.

2. Description of the Prior Art

Recently, an optical memory system has been developed, which optically stores the information in high density and in the mass storage order. The optical memory system ensures the high density, mass storage because the information recording unit (bit) is determined by the diameter of the beam which is used in the recording operation and the reading operation. Generally, the bit size is selected about 1 $\mu$m.

However, in order to ensure the high density, mass storage, the optical beam position must be accurately controlled so that the information is recorded at a predetermined position, and the information is read out from a preselected position. In the case of the optical memory system of the read only type, address information can be recorded on the optical memory element when data information is recorded on the optical memory element. Accordingly, the optical beam position is controllable while the data information is read out from the optical memory element. However, in the optical memory system of the add-on-memory type or the erasable memory type, it is difficult to record the address information on the optical memory element while the data information is recorded on the optical memory element. Therefore, in the add-on optical memory or the erasable optical memory, guide signals or guide addresses are normally recorded on the optical memory element, which are used to control the optical beam position.

FIG. 1 schematically shows the general construction of the optical memory element of the add-on-memory type or the erasable memory type. Stripe-shaped grooves are formed on the optical memory element. The information recording operation and the information playback operation are conducted along the stripe-shaped grooves. The stripe-shaped grooves can be intermittently formed so as to bear the bit information representing the address of the groove. Some methods for forming the stripe-shaped grooves on the optical memory element have been proposed.

FIG. 2 shows an example of the conventional method for forming the stripe-shaped grooves on the optical memory element. A nickel (Ni) stamper 1 having the stripe-shaped grooves formed thereon is employed to transcribe the stripe-shaped grooves onto a resin substrate 2 made of, for example, acrylic or polycarbonate, through the use of the injection molding method.

FIG. 3 shows another example of the conventional method for forming the stripe-shaped grooves on the optical memory element. Photo-polymer 3 is interposed between the stamper 1, having the stripe-shaped grooves formed thereon, and a substrate 4 made of, for example, glass or acrylic so as to transcribe the stripe-shaped grooves onto the photo-polymer 3 (namely, the 2P method).

Both methods employ the resin layer in the optical memory element. Therefore, there is a possibility that oxygen or moisture reaches the recording material through the resin layer. This will deteriorate the recording material. That is, the conventional method does not ensure a stable operation of the optical memory element.

OBJECTS AND SUMMARY OF THE INVENTION

OBJECTS OF THE INVENTION

Accordingly, an object of the present invention is to provide a novel method for manufacturing an optical memory element of the add-on-memory type or the erasable memory type.

Another object of the present invention is to provide a method for manufacturing an optical memory element, which ensures a stable operation of the recording material.

Still another object of the present invention is to provide a method for forming stripe-shaped grooves on a substrate in an optical memory element of the add-on-memory type or the erasable memory type.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

SUMMARY OF THE INVENTION

To achieve the above objects, pursuant to an embodiment of the present invention, stripe-shaped grooves are formed on a glass substrate through the use of an etching method. In a preferred form, a resist film is first disposed on the glass substrate. A laser beam is applied onto the resist film in order to form a guide groove pattern in the resist film. The thus formed guide groove pattern is developed, and, then, the etching operation is conducted to the glass substrate while the developed resist film, having the guide groove pattern formed therein, is disposed on the glass substrate. Stripe-shaped grooves are formed in the glass substrate in accordance with the guide groove pattern of the resist film. The resist film is removed after the etching operation. Then, a recording material is disposed on the glass substrate to form an optical memory element.

BRIEF DESCRIPTION OF THE DRAWINGS

The present invention will be better understood from the detailed description given hereinbelow and the accompanying drawings which are given by way of illustration only, and thus are not limitative of the present invention and wherein.

DESCRIPTION OF THE PREFERRED EMBODIMENTS

FIGS. 4(A) through 4(E) show steps for forming stripe-shaped grooves in the glass substrate in an embodiment of the present invention.

STEP 1

A glass substrate 5 is used as a substrate of an optical memory element because the glass substrate does not pass oxygen and moisture therethrough. The glass substrate 5 is coated with a resist film 6 (FIG. 4(A)).

STEP 2

Figure 1:
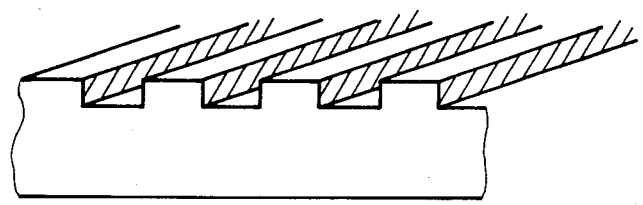
FIG. 1 is a perspective view of an essential part of an optical memory element of the add-on-memory type or the erasable memory type.
Figure 2:
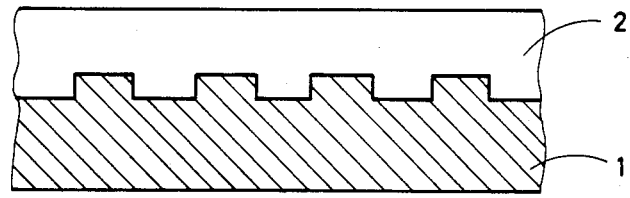
FIG. 2 is a sectional view showing a manufacturing step of an example of the conventional method for manufacturing the optical memory element.
Figure 3:
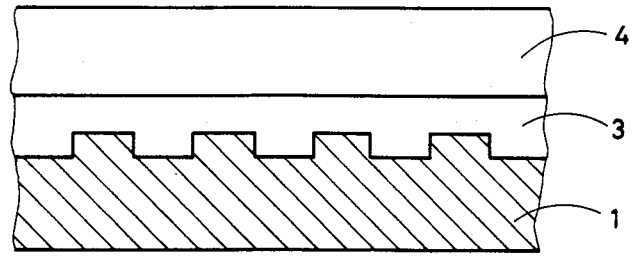
FIG. 3 is a sectional view showing a manufacturing step of another example of the conventional method for manufacturing the optical memory element.
Figure 4:
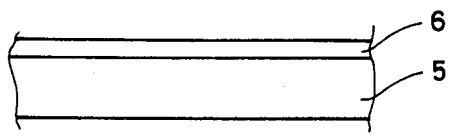
FIGS. 4(A) through 4(E) are sectional views for explaining manufacturing steps of an embodiment of a method of the present invention.
Figure 4:
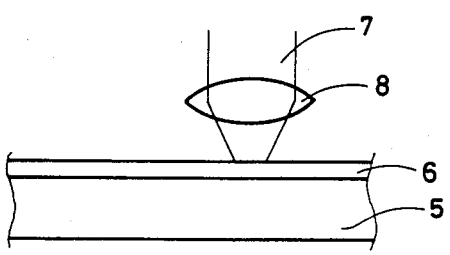
Figure 4:
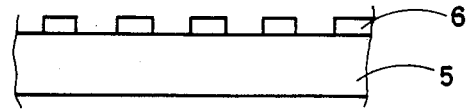
Figure 4:
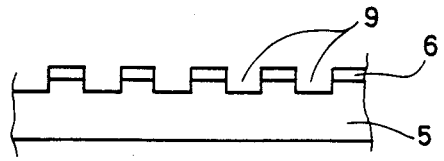
Figure 4:
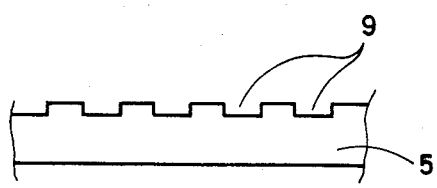

An argon (Ar) laser beam 7 is applied to the resist film 6 disposed on the glass substrate 5, via an objective lens 8, so as to describe lines having a desired width corresponding to the guide groove shown in FIG. 1. In a preferred form, the described line has an intermittent configuration to show the address information. (FIG. 4(B))

STEP 3

Developing operation is conducted to the resist film 6 which has the described lines. Stripe-shaped grooves are formed in the resist film 6 (FIG. 4(C)).

STEP 4

Sputtering operation (reactive ion etching) is conducted to the glass substrate 5 coated by the developinng resist film 6 within the etching gas, for example, CF$_4$ or CHF$_3$. Stripe-shaped grooves 9 are formed in the glass substrate 5 (FIG. 4(D)).

STEP 5

The developed resist film 6 is removed from the glass substrate 5 through the use of solvent such as acetone, or by means of sputtering in the O$_2$ atmosphere. In this way, stripe-shaped grooves 9 are formed in the glass substrate 5 (FIG. 4(E)).

In the embodiment of FIGS. 4(A) through 4(E), the argon (Ar) laser beam 7 is employed to form the latent guide pattern in the resist film 6 at the step 2. Instead, a photo-mask carrying the guide groove pattern can be employed. In this case, ultraviolet rays are uniformly applied to the resist film 6 via the photo-mask, thereby forming the latent guide pattern in the resist film 6.

Figure 5:
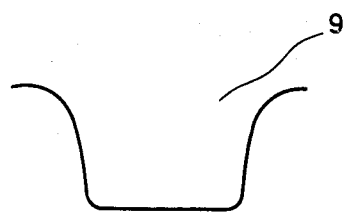
FIGS. 5(A) and 5(B) are sectional views of examples of a groove formed by the method of FIGS. 4(A) through 4(E)
Figure 5:
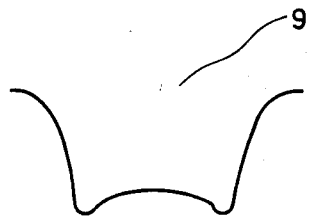

FIGS. 5(A) and 5(B) show the sectional configurations of the stripe-shaped grooves 9 when the condition of the reactive ion etching (step 4) is changed. The sectional configurations are measured by the Taly step.

FIG. 5(A) shows an example wherein the bottom of the groove 9 has a flat surface. The depth of the groove 9 is 500 Å, and the width of the groove 9 is 1 μm. FIG. 5(B) shows another example wherein the bottom of the groove 9 has a curved surface. Optical memory elements having the grooves shown in FIG. 5(A) and FIG. 5(B) were formed to compare the characteristics. The data reading operation was conducted while using the grooves as the guide tracks, and the noises of the reproduced signal were measured while conducting the servo operation. The optical memory element having the grooves shown in FIG. 5(A) developed an output signal of which the noise component is lower than that of the output signal developed from the optical memory element having the grooves shown in FIG. 5(B) by 2 to 3 dB. That is, higher reliability is ensured if the groove 9 has the flat bottom surface. The etching condition for forming the groove 9 shown in FIG. 5(A) has a lower etching gas pressure and a higher self-bias of the sputter electrode as compared with the etching condition for forming the groove shown in FIG. 5(B).

Figure 6:
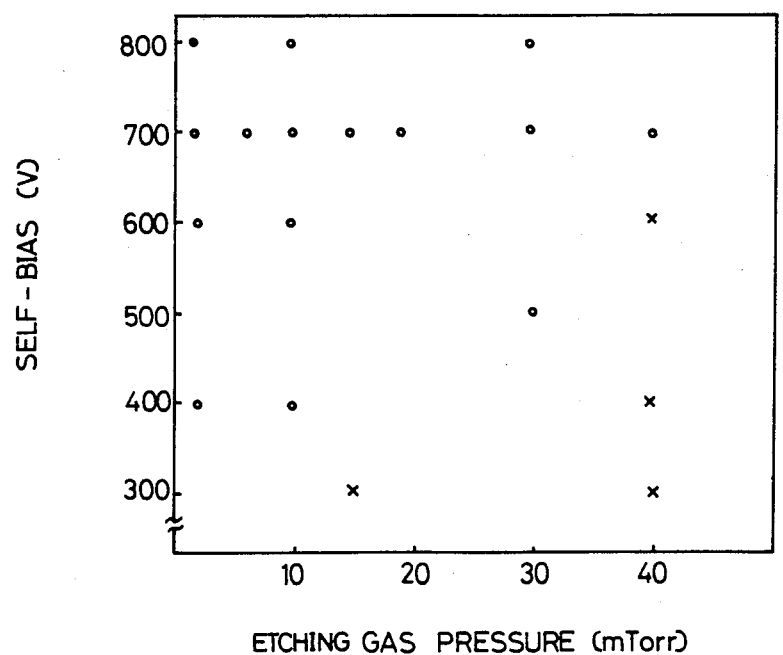
FIG. 6 is a graph showing the groove condition formed by the method of FIGS. 4(A) through 4(E), when the etching condition is changed.

FIG. 6 shows the groove condition when the etching condition is changed. The points marked by the symbol "o" represent the condition at which the groove having the flat bottom surface is formed, and the points marked by the symbol "x" represent the condition at which the groove having the curved bottom surface is formed. It will be clear from FIG. 6 that a desirable groove having the flat bottom surface is formed when the etching gas pressure is selected lower than about 30 mTorr and the self-bias of the sputter electrode is selected higher than 400 V at the reactive etching step.

Figure 7:
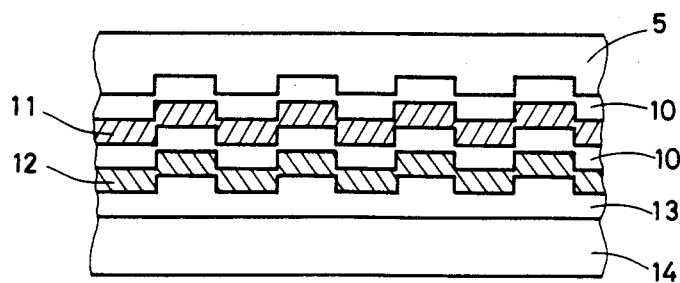
FIG. 7 is a sectional view of an optical memory element formed by the method of FIGS. 4(A) through 4(E)

FIG. 7 shows an example of an optical memory element which has the above-mentioned desired groove formed by the method of FIGS. 4(A) through 4(E). The glass substrate 5 has the stripe-shaped grooves formed under the above-mentioned desired etching condition. A dielectric layer 10 made of a nitride film such as an AlN film or a Si$_3$N$_4$ film is disposed on the glass substrate 5. A recording medium layer 11 made of a thin-film of alloy including rare earth elements and transition metals, for example, GdNdFe, GdTbFe or GdCo is formed on the dielectric layer 10. Another dielectric layer 10 is disposed on the recording medium layer 11 so that the recording medium layer 11 is sandwiched between a pair of dielectric layers 10. A reflection film 12 made of, for example, an aluminum film or a stainless steel film is disposed on the last mentioned dielectric layer 10. The dielectric layers 10 and the reflection film 12 function, in combination, to enhance the magneto-optical effect characteristics and to prevent oxygen and moisture from reaching the recording medium layer 11. A protective plate 14 made of, for example, a glass plate or an acrylic plate is attached to the reflection film 12 via an adhesion layer 13. The protective plate 14 can be omitted when two optical memory elements are attached to each other in a manner that the rear surfaces thereof are attached to each other. In this case, the optical memory device is the both-side disc.

Although the optical memory element of FIG. 7 employs the reflection film 12, the reflection film 12 can be omitted when the recording medium layer 11 has a sufficient thickness. Such a type is called as the optical memory element of the single layer construction. Furthermore, the present invention is applicable to the optical memory element of the add-on-memory type which includes a recording medium layer made of Te, TeS or TeO$_x$.

Figure 8:
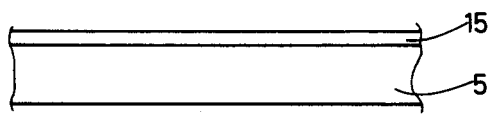
FIGS. 8(A) and 8(B) are sectional views for explaining manufacturing steps of another embodiment of a method of the present invention.
Figure 8:
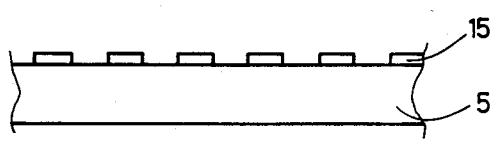

FIGS. 8(A) and 8(B) show steps for forming stripe-shaped grooves in another embodiment of the present invention. A SiO₂ layer 15 is formed on the glass substrate 5 by means of the sputtering method, electron beam evaporation method, or the CVD method (FIG. 8(A)). The SiO₂ layer 15 is not necessarily a SiO₂ layer exactly, but a $SiO_x$ layer functions in a same manner. The resist film 6 is disposed on the SiO₂ layer 15, and the same steps as those of FIGS. 4(A) to 4(E) are carried out to form the stripe-shaped grooves in the SiO₂ layer 15 (FIG. 8(B)).

Since the grooves are formed in the SiO₂ layer 15 in the embodiment of FIGS. 8(A) and 8(B), the sputter-etching operation is conducted in a shorter time period as compared with the method of FIGS. 4(A) through 4(E). Furthermore, the etching depth is easily controlled so that the grooves have the uniform depth, because the grooves are formed only in the SiO₂ layer 15 but not formed in the glass substrate 5. The uniform etching depth is difficult to obtain in the embodiment of FIGS. 4(A) through 4(E) when the glass substrate 5 does not have the uniform composition.

Figure 9:
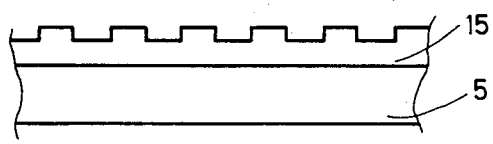
FIG. 9 is a sectional view for explaining a step of still another embodiment of a method of the present invention.

FIG. 9 shows stripe-shaped grooves formed by still another embodiment of the present invention. The SiO₂ layer 15 has a sufficient thickness, and the sputter-etching operation is terminated when the bottom of the groove reaches the middle portion of the entire thickness of the SiO₂ layer 15. Since the entire surface of the glass substrate 5 is covered by the SiO₂ layer 15, the metal material included in the glass substrate 5 such as alkali metal, for example, sodium will never elute on the surface of the substrate. Thus, the recording medium layer will not be deteriorated by the metal material eluted from the glass substrate 5.

In the embodiment of FIGS. 8(A), 8(B) and 9, the SiO₂ film 15 (or $SiO_x$ film) is formed on the glass substrate 5, and the stripe-shaped grooves are formed in the SiO₂ film 15. However, instead of the SiO₂ film ($SiO_x$ film), another dielectric film, for example, a $Si_3N_4$ film, an AlN film, or a MgF film can be used, or a laminaated layer of these dielectric films can be used.

Figure 10:
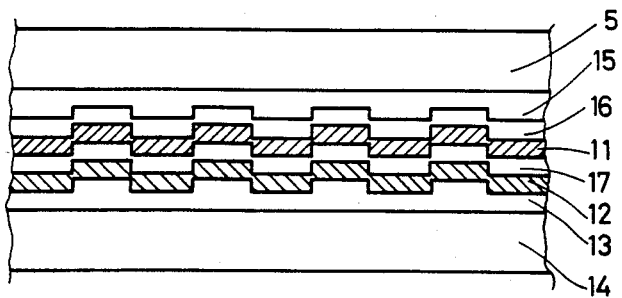
FIG. 10 is a sectional view of an optical memory element formed by the method of FIG. 9.

FIG. 10 shows an example of an optical memory element which includes the stripe-shaped grooves formed by the method of FIG. 9. The SiO₂ film 15 is formed on the glass substrate 5. The stripe-shaped grooves are formed in the SiO₂ film 15 (the grooves function as the guide tracks). A dielectric layer 16 having the index of refraction higher than that of the SiO₂ film 15 is formed on the SiO₂ film 15. The dielectric layer 16 is preferably made of an AlN film or a SiO film, and preferably has a thickness of about 500 Å to 1000 Å. The recording medium layer 11 made of a thin-film of alloy including rare earth elements and transition metals, for example, GdTbFe, TbFe or GdCoFe is formed on the dielectric layer 16. The recording medium layer 11 has a thickness about 50 Å through 400 Å. The minimum thickness of the recording medium layer 11 is determined by the minimum requirement for ensuring the formation of the perpendicular magnetization film. The maximum thickness of the recording medium layer 11 is determined by the limit thickness for ensuring stable operation related to the magneto-optical effects. Thus, the preferred thickness of the recording medium layer 11 varies depending on the condition for manufacturing the recording medium layer 11. When the recording medium layer 11 is formed by the sputtering method, the perpendicular magnetization film is difficult to obtain if the film thickness is less than 50 Å.

Another dielectric layer 17 made of, for example, an AlN film or a SiO₂ film is formed on the recording medium layer 11. The reflection film 12 made of, for example, Cu, Al, Ni or stainless steel is disposed on the dielectric layer 17. The dielectric layer 17 and the reflection film 12 function, in combination, to enhance the magneto-optical effect characteristics and to prevent oxygen and moisture from reaching the recording medium layer 11. The protective plate 14 made of, for example, a glass plate or an acrylic plate is attached to the reflection film 12 via the adhesion layer 13.

The invention being thus described, it will be obvious that the same may be varied in many ways. Such variations are not to be regarded as a departure from the spirit and scope of the invention. and all such modifications are intended to be included within the scope of the following claims.

What is claimed is:

1. A method for manufacturing an optical memory element comprising the steps of:
   providing a substrate;
   disposing a resist film on said substrate;
   forming a guide groove pattern latent image on said resist film;
   developing said guide groove pattern latent image formed on said resist film;
   conducting an etching operation through said developed guide groove pattern so as to form guide grooves in said substrate;
   removing said developed guide groove pattern from said substrate; and
   disposing a recording medium layer on said substrate having said guide grooves formed therein.

2. The method for manufacturing an optical memory element of claim 1, wherein said substrate is a glass substrate.

3. The method for manufacturing an optical memory element of claim 1, wherein said guide groove pattern latent image is described on said resist film by a laser beam.

4. The method for manufacturing an optical memory element of claim 1, wherein said etching operation is a reactive ion etching operation conducted under the condition of:
   the etching gas pressure lower than 30 mTorr; and
   the self-bias of the sputter electrode higher than 400 V.

5. The method for manufacturing an optical memory element of claim 1, wherein said recording medium layer is a thin-film of alloy including rare earth elements and transition metals.

6. The method for manufacturing an optical memory element of claim 5, wherein said alloy is GdNdFe.

7. The method for manufacturing an optical memory element of claim 5, wherein said alloy is GdTbFe.

8. The method for manufacturing an optical memory element of claim 5, wherein said alloy is GdCo.

9. A method for manufacturing an optical memory element comprising the steps of:
   providing a glass substrate;
   disposing a resist film on said substrate;
   forming a guide groove pattern latent image on said resist film;
   developing said guide groove pattern latent image formed on said resist film;
   conducting an etching operation through said developed guide groove pattern so as to form guide grooves in said glass substrate;

removing said developed guide groove pattern resist film from said glass substrate;

disposing a first dielectric layer on said glass substrate having said guide grooves formed therein;

disposing a recording medium layer on said first dielectric layer; and disposing a second dielectric layer on said recording medium layer.

10. The method for manufacturing an optical memory element of claim 9, wherein said etching operation is a reactive ion etching conducted under the condition of:

the etching gas pressure lower than 30 mTorr; and the self-bias of the sputter electrode higher than 400 V.

11. A method for manufacturing an optical memory element comprising the steps of:

providing a substrate;

forming a $SiO_2$ layer on said substrate;

disposing a resist film on said $SiO_2$ layer;

forming a guide groove pattern latent image on said resist film;

developing said guide groove pattern latent image formed on said resist film;

conducting an etching operation through said developed guide groove pattern so as to form guide grooves in said $SiO_2$ layer;

removing said developing guide groove pattern resist film from said $SiO_2$ layer;

disposing a first dielectric layer on said $SiO_2$ layer having said guide grooves formed therein, said first dielectric layer having the index of refraction higher than that of said $SiO_2$ layer;

disposing a recording medium layer on said first dielectric layer; and disposing a second dielectric layer on said recording medium layer.

12. The method for manufacturing an optical memory element of claim 11, wherein said recording medium layer is a thin-film of alloy including rare earth elements and transition metals.

13. The method for manufacturing an optical memory element of claim 12, wherein said alloy is GdTbFe.

14. The method for manufacturing an optical memory element of claim 12, wherein said alloy is TbFe.

15. The method for manufacturing an optical memory element of claim 12, wherein said alloy in GdCoFe.

16. The method for manufacturing an optical memory element of claim 12, wherein said thin-film has a thickness of about 50 Å through 400 Å.

* * * * *